Patented Oct. 29, 1946

2,410,401

UNITED STATES PATENT OFFICE 2,410,401

PREPARATION OF A THIOPHENE

Donald Drake Coffman, Lindamere, Del., assignor to E. I. du Pont de Nemours & Company, Wilmington, Del., a corporation of Delaware No Drawing. Application October 22, 1942, Serial No. 462,992

12 Claims. (Cl. 260—329)

This invention relates to the preparation of thiophene.

Thiophene has been prepared by dripping butadiene on molten sulfur at 350° C. but in poor yield. Substituted thiophenes have been prepared from other 1,3-diolefines and sulfur but also with yields capable of considerable improvement.

This invention has as an object an improvement in the process of making thiophene from butadiene and sulfur. Another object is the provision of a process for making thiophene compounds from 1,3-diolefines and sulfur. Other objects will appear hereinafter.

These objects are accomplished by the following invention wherein a conjugated diene is reacted with sulfur in the vapor phase at a temperature of at least 350° C. and preferably at least 445° C.

The synthesis of thiophenes from 1,3-dienes is conveniently carried out by passing the 1,3-diene through sulfur vapor. In the preferred mode of operation the 1,3-diene is passed through sulfur vapor at a temperature of 445° C., the boiling point of sulfur at atmospheric pressure, at contact times varying from 10 to 110 seconds. This is accomplished by boiling sulfur in a vertical reactor so that the space occupied by the sulfur is about 200 to about 370 volumes. The vaporized 1,3-diene is introduced in the gaseous form at a rate of 200 to 600 volumes/minute at a point immediately above the surface of the liquid sulfur and in such a manner that the direction of flow is away from the molten sulfur. The exit gases from the reaction zone are condensed by means of suitable traps. The thiophene is obtained from the condensate by fractional distillation together with unreacted 1,3-diene and carbon disulfide.

In an alternative method, the 1,3-diene is led into the reaction zone together with an inert diluent such as nitrogen. This procedure adds another means of controlling the time of contact. The nitrogen pressure prevents stoppage due to collection of polymeric material in the inlets and outlets of the reactor since it exerts a pressure at all times and opens constricted places. This is of advantage in the utilization of 1,3-dienes that are liquids under ordinary conditions.

The more detailed practice of the invention is illustrated by the following examples, wherein parts given are by weight. There are of course many forms of the invention other than these specific embodiments.

Example I

This example illustrates the synthesis of thiophene by the reaction of butadiene and sulfur in the vapor phase.

Fifty parts of sulfur are placed in a vertical reactor closed at the lower end, fitted with an inlet so that gases can be introduced above the sulfur, and having an opening at the top that leads to a condensing system capable of liquefying thiophene, carbon disulfide and butadiene. Dry, oxygen-free nitrogen is passed through the system and then the reactor is heated until the sulfur boils so that the sulfur vapor occupies a space of 335 volumes above the butadiene inlet. Butadiene is passed through the sulfur vapor at 445° C., at a rate of 190 volumes/minute. Under these conditions the butadiene is in contact with sulfur vapor at 445° C. for 104 seconds. After 2 hours, during which time a total of 21 parts of butadiene pass through the system, the reaction is stopped. Fractional distillation of the condensed gases yields 9.73 parts of thiophene, 6 parts of butadiene and 7 parts of carbon disulfide. The yield of thiophene is 41% of the theoretical amount and the conversion of butadiene to thiophene is 30%. The thiophene synthesized by this procedure boils at 84° C. and reacts with mercuric chloride to give alpha-chloromercurithiophene melting at 179° C.

When butadiene is dropped on molten sulfur at 350° C., as in the previously known method, the yield of thiophene is only 6%.

Example II

This example illustrates the synthesis of 3-chlorothiophene by reaction of chloroprene and sulfur in the vapor phase.

The synthesis of 3-chlorothiophene is carried out in a reactor similar to that described in Example I having an inlet above the level of the molten sulfur and an outlet leading to a condensing system. The reactor is charged with 200 parts of sulfur and heated so that the sulfur vapor occupies a space of 217 volumes above the inlet. Dry, oxygen-free nitrogen is passed through the system at a rate of 100 volumes/minute. Simultaneously gaseous chloroprene at 445° C. is passed into the sulfur vapor in a direction away from the molten sulfur and at a rate of 530 volumes/minute. Under these conditions the chloroprene remains in contact with the sulfur vapor for 21 seconds at 445° C. At the end of one hour, during which time 48 parts of choloprene is passed through the system, the reaction is stopped. Eleven parts of 3-chlorothiophene boiling between 130 and 140° C. are obtained by fractional distillation of the condensate, the remainder being small amounts of carbon disulfide and chloroprene. This corresponds to a yield of 17% of the theoretical amount of 3-chlorothiophene as compared to a 2% yield obtained when the same reaction is carried out in the liquid phase, i. e., by dropping chloroprene onto molten sulfur at about 350° C.

*Example III*

This example illustrates the synthesis of 3-methylthiophene by the vapor phase reaction of isoprene and sulfur.

The equipment used is the same as that described in Example I. The reaction tube is charged with 175 parts of sulfur and is then heated until the sulfur is molten. After flushing the system thoroughly with dry nitrogen the reaction tube is heated until the sulfur boils so that the sulfur vapor occupies a space of 365 volumes above the 1,3-diene inlet of the reactor. Isoprene is then passed through the sulfur at a rate of 470 volumes/minute, together with nitrogen at 445° C. at a rate of 176 volumes/minute. Under these conditions the isoprene and sulfur vapor are in contact for 34 seconds. After 15 minutes, during which time 8.1 parts of isoprene pass through the system, the reaction is stopped. The condensate from the reactor amounts to 6 parts, 5.5 parts of which is 3-methylthiophene boiling at 110°–120° C. The remainder consists of non-volatile sulfurous residues entrained by the nitrogen during the reaction and carried over to the trap, together with small but indeterminate amounts of isoprene. The 3-methylthiophene is readily identified by reaction with mercuric chloride to form chloromercuri-3-methylthiophene which melts at 128°–129° C. after recrystallization from alcohol. The yield of 3-methylthiophene is 47% of the theoretical amount.

The invention is exemplified above with butadiene, isoprene, and chloroprene, but is applicable to any conjugated diene volatile at 350° C., including dimethyl-2,3-butadiene, 1- and 2-phenyl butadiene, the di-, tri, tetra- and pentachlorobutadienes, bromo-2-butadiene-1,3, trimethoxybutadiene, 1-cyano-1,3-butadiene, 1-carbomethoxy-1,3-butadiene, etc. Preferably, conjugated diene hydrocarbons are used since they have less tendency, in general, to polymerization and side reaction than compounds containing substituents.

The contact time can easily be controlled by adjusting the reaction volume, i. e., the volume occupied by the sulfur vapor, and the rate at which the 1,3-diene is passed through the sulfur vapor. A further means for controlling the contact time involves dilution of the 1,3-diene with an inert gas such as oxygen-free nitrogen. The use of a diluent is especially valuble as an aid to vaporization when liquid 1,3-dienes are employed or in retarding polymerization when an especially reactive 1,3-diene is used. Preferred contact times vary between 10 seconds and 110 seconds depending upon the 1,3-diene employed.

The synthesis of thiophene by the vapor phase reaction of 1,3-dienes and sulfur can be carried out at a temperature as low as 350° C. However, preferred temperatures for the vapor phase process range from the boiling point of sulfur at 760 mm., i. e., about 445° C., to temperatures at which the 1,3-diene employed undergoes thermal decomposition. At excessively high temperatures, the yield of thiophene is decreased due to destruction of the 1,3-diene by increased thermal decomposition. If temperatures lower than the boiling point of sulfur are used at atmospheric pressure, the yields are not as good since an appreciable concentration of sulfur in the vapor phase is difficulty maintained. However, this can be remedied by working in a closed system under reduced pressure, although this introduces complications in the apparatus and process. It is preferred to operate at atmospheric pressure and 445° C. as above.

The concentrations of reactants is dependent upon the contact time and the temperature, limits for which are set by the factors above discussed. Thus, the concentration of sulfur vapor in the reaction zone depends upon the temperature, and the concentration of the 1,3-diene depends upon the rate at which it is passed through the sulfur vapor and whether or not an inert diluent is used. Both of these variables are expressed in the contact time.

Various types of apparatus may be used in the process of this invention so long as the design is such that the gaseous conjugated diene is passed through the reaction zone in contact with sulfur vapor at an elevated temperature, preferably above the atmospheric boiling point of sulfur.

The above description and examples are intended to be illustrative only. Any modification of or variation therefrom which conforms to the spirit of the invention is intended to be included within the scope of the claims.

What is claimed is:

1. A process for the preparation of thiophene which comprises reacting gaseous butadiene with sulfur vapor by contacting the butadiene with the sulfur vapor at a temperature between 45° C. and the thermal decomposition temperature of butadiene.

2. A process for the preparation of a thiophene which comprises reacting a conjugated diene hydrocarbon in the gaseous state with sulfur vapor by contacting the hydrocarbon with the sulfur vapor at a temperature between 445° C. and the thermal decomposition temperature of the conjugated diene.

3. A process for the preparation of 3-chlorothiophene which comprises reacting gaseous chlorobutadiene with sulfur vapor by contacting the chlorobutadiene with the sulfur vapor at a temperature between 445° C. and the thermal decomposition temperature of the chlorobutadiene.

4. A process for the preparation of halogenated thiophenes which comprises reacting a halogenated butadiene in the gaseous state with sulfur vapor by contacting the halogenated butadiene with the sulfur vapor at a temperature between 445° C. and the thermal decomposition temperature of the halogenated butadiene.

5. A process for the preparation of a thiophene which comprises reacting a conjugated diene in the gaseous state with sulfur vapor by contacting the conjugated diene with the sulfur vapor at a temperature between 445° C. and the thermal decomposition temperature of the conjugated diene.

6. A process for the preparation of a thiophene which comprises reacting a conjugated diene in the gaseous state with sulfur vapor by contacting the conjugated diene with the sulfur vapor at a temperature of at least 350° C.

7. A process for the preparation of a thiophene which comprises reacting a conjugated diene in the gaseous state with sulfur vapor by contacting the conjugated diene with the sulfur vapor at a temperature between 445° C. and the thermal decomposition temperature of the conjugated diene and for a contact time of 10-110 seconds.

8. A process for the preparation of a thiophene which comprises reacting a halogenated butadiene in the gaseous state with sulfur vapor by contacting the chlorobutadiene with the sulfur vapor at a temperature between 445° C. and the thermal decomposition temperature of the halogenated butadiene and for a contact time of 10-110 seconds.

9. A process for the preparation of 3-chlorothiophene which comprises reacting gaseous chlorobutadiene with sulfur vapor by contacting the chlorobutadiene with the sulfur vapor at a temperature between 445° C. and the thermal decomposition temperature of the chlorobutadiene and for a contact time of 10-110 seconds.

10. A process for the preparation of a thiophene which comprises reacting a conjugated diene hydrocarbon in the gaseous state with sulfur vapor by contacting the hydrocarbon with the sulfur vapor at a temperature between 445° C. and the thermal decomposition temperature of the conjugated diene and for a contact time of 10-110 seconds.

11. A process for the preparation of thiophene which comprises reacting gaseous butadiene with sulfur vapor by contacting the butadiene with the sulfur vapor at a temperature between 445° C. and the thermal decomposition temperature of butadiene and for a contact time of 10-110 seconds.

12. A process for the preparation of 3-methylthiophene which comprises reacting gaseous isoprene with sulfur vapor by contacting the gaseous isoprene with the sulfur vapor at a temperature between 445° C. and the thermal decomposition temperature of isoprene.

DONALD DRAKE COFFMAN.